United States Patent
Shiramizu

(10) Patent No.: US 12,305,702 B2
(45) Date of Patent: May 20, 2025

(54) WHEEL BEARING DEVICE

(71) Applicant: JTEKT CORPORATION, Kariya (JP)

(72) Inventor: Koki Shiramizu, Yamatotakada (JP)

(73) Assignee: JTEKT CORPORATION, Kariya (JP)

( * ) Notice: Subject to any disclaimer, the term of this patent is extended or adjusted under 35 U.S.C. 154(b) by 55 days.

(21) Appl. No.: 18/275,485

(22) PCT Filed: Mar. 1, 2021

(86) PCT No.: PCT/JP2021/007738
§ 371 (c)(1),
(2) Date: Aug. 2, 2023

(87) PCT Pub. No.: WO2022/185382
PCT Pub. Date: Sep. 9, 2022

(65) Prior Publication Data
US 2024/0110596 A1 Apr. 4, 2024

(51) Int. Cl.
*F16C 19/18* (2006.01)
*B60B 27/00* (2006.01)

(52) U.S. Cl.
CPC ........ *F16C 19/186* (2013.01); *B60B 27/0005* (2013.01); *B60B 27/0094* (2013.01); *F16C 2240/34* (2013.01); *F16C 2326/02* (2013.01)

(58) Field of Classification Search
CPC ................ F16C 19/186; F16C 2326/02; F16C 2240/34; B60B 27/0005; B60B 27/0094
See application file for complete search history.

(56) References Cited

U.S. PATENT DOCUMENTS 5,206,993 A * 5/1993 Brough .................. F16C 43/04
384/450
8,714,828 B2 5/2014 Ciulla
(Continued)

FOREIGN PATENT DOCUMENTS

| JP | 2000-161368 A | 6/2000 |
| JP | 2004-345439 A | 12/2004 |
| JP | 2013-177913 A | 9/2013 |

(Continued)

OTHER PUBLICATIONS

Machine Translation of WO-2024185760-A1 (Year: 2024).*
Apr. 27, 2021 International Search Report issued in International Patent Application No. PCT/JP2021/007738.

*Primary Examiner* — Alan B Waits
(74) *Attorney, Agent, or Firm* — Oliff PLC

(57) ABSTRACT

A wheel bearing device includes: an inner shaft including a wheel mounting flange on one side in an axial direction and including double row inner raceway surfaces on the other; an outer ring including double row outer raceway surfaces facing the inner surfaces; a plurality of first balls interposed between a first inner raceway surface located on the one side in the axial direction out of the double row inner raceway surfaces and a first outer raceway surface located on the one side in the axial direction out of the double row outer raceway surfaces; and a plurality of second balls interposed between a second inner raceway surface and a second outer raceway surface. The plurality of first balls and the plurality of second balls have the same diameter. A contact angle of the plurality of first balls is smaller than a contact angle of the plurality of second balls.

3 Claims, 4 Drawing Sheets

(56) References Cited

U.S. PATENT DOCUMENTS

| | | | | |
|---|---|---|---|---|
| 2009/0199660 A1* | 8/2009 | Ozaki | .................... | B60B 27/00 |
| | | | | 73/862.381 |
| 2014/0010489 A1* | 1/2014 | Duch | ................... | F16C 33/805 |
| | | | | 384/480 |

FOREIGN PATENT DOCUMENTS

| | | |
|---|---|---|
| JP | 2014-031136 A | 2/2014 |
| JP | 2017-128236 A | 7/2017 |
| KR | 10-2006-0118316 A | 11/2006 |
| WO | 2005/065077 A2 | 7/2005 |
| WO | WO-2024185760 A1 * | 9/2024 |

* cited by examiner

WHEEL BEARING DEVICE

TECHNICAL FIELD

The present invention relates to wheel bearing devices.

BACKGROUND ART

A wheel bearing device called a hub unit is used to rotatably support a wheel with respect to a body of an automobile. A double row angular contact ball bearing is sometimes used as this wheel bearing device. The wheel bearing device includes an inner member having a wheel mounting flange on one side in the axial direction, an outer member, and a plurality of balls arranged in double rows and interposed between the two members. The plurality of balls includes a plurality of first balls arranged in a row on the one side in the axial direction out of the double rows, and a plurality of second balls arranged in a row on the other side in the axial direction out of the double rows (see Patent Document 1, for example).

RELATED ART DOCUMENTS

Patent Documents

Patent Document 1: Japanese Unexamined Patent Application Publication No. 2014-31136 (JP 2014-31136 A)

SUMMARY OF THE INVENTION

Problem to be Solved by the Invention

When the wheel runs over a curb along the side of a road or the lower side of a side surface of the wheel hits the curb (side collision), the lower side of the side surface of the wheel is pressed by the curb. At this time, an excessive moment load may be applied to the wheel bearing device. This moment load is applied to the inner member via the wheel mounting flange. This load acts so as to press an end on the one side in the axial direction of the inner member downward.

When such a moment load is applied to the inner member, the first balls located below the central axis of the bearing device out of the plurality of first balls arranged on the one side in the axial direction (wheel side) are subjected to an excessive load (rolling element load). Therefore, brinelling is very likely to occur on the raceway surface on the one side in the axial direction on which the first balls roll.

Moreover, when such an excessive moment load is applied to the inner member, the contact angle of the first balls located below the central axis temporarily increases. On the other hand, the contact angle of the second balls located below the central axis temporarily decreases.

The contact angle of the first balls and the contact angle of the second balls are typically set to the same value. Therefore, when such a moment load is applied to the inner member, the contact angle of the first balls becomes relatively larger than the contact angle of the second balls. When the contact angle of the first balls increases, an allowable radial load on the first balls relatively decreases, and the load is concentrated on the first balls, which facilitates brinelling on the raceway surface on the one side in the axial direction.

The brinelling on the raceway surface causes abnormal noise, flaking of the raceway surface, etc. A method for reducing such brinelling is therefore desired.

Means for Solving the Problem

A wheel bearing device according to the present invention includes: an inner member including a wheel mounting flange on one side in an axial direction and including double row inner raceway surfaces on the other side in the axial direction; an outer member including double row outer raceway surfaces facing the double row inner raceway surfaces; a plurality of first balls interposed between a first inner raceway surface located on the one side in the axial direction out of the double row inner raceway surfaces and a first outer raceway surface located on the one side in the axial direction out of the double row outer raceway surfaces; and a plurality of second balls interposed between a second inner raceway surface located on the other side in the axial direction out of the double row inner raceway surfaces and a second outer raceway surface located on the other side in the axial direction out of the double row outer raceway surfaces. The plurality of first balls and the plurality of second balls have a same diameter, and a contact angle of the plurality of first balls is smaller than a contact angle of the plurality of second balls.

Effects of the Invention

According to the present disclosure, brinelling on a raceway surface can be reduced.

MODES FOR CARRYING OUT THE INVENTION

Figure 1:
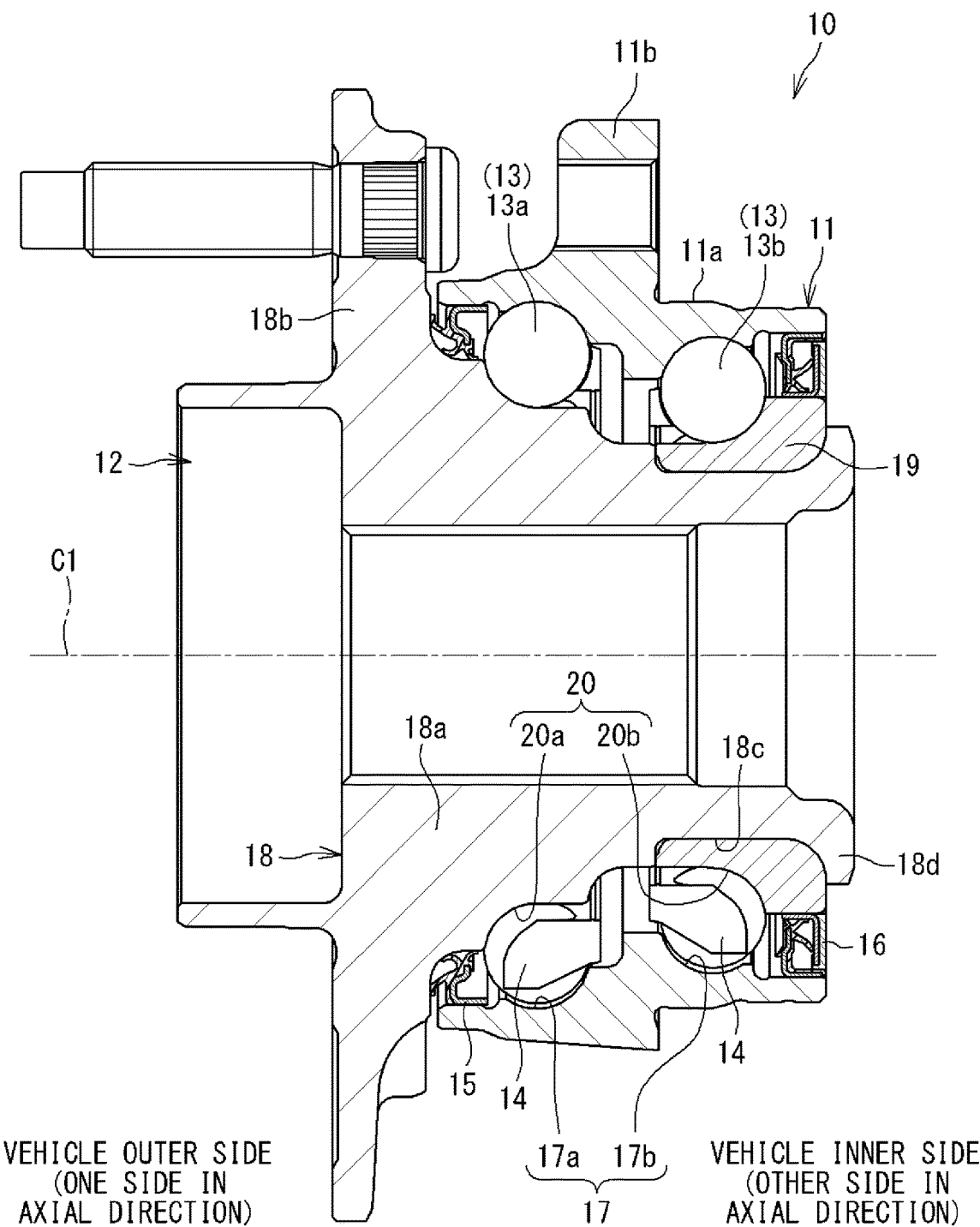
FIG. 1 is a sectional view of a wheel bearing device.

First, the content of an embodiment will be listed and described.

Summary of Embodiment (1) A wheel bearing device that is an embodiment includes: an inner member including a wheel mounting flange on one side in an axial direction and including double row inner raceway surfaces on the other side in the axial direction; an outer member including double row outer raceway surfaces facing the double row inner raceway surfaces; a plurality of first balls interposed between a first inner raceway surface located on the one side in the axial direction out of the double row inner raceway surfaces and a first outer raceway surface located on the one side in the axial direction out of the double row outer raceway surfaces; and a plurality of second balls interposed between a second inner raceway surface located on the other side in the axial direction out of the double row inner raceway surfaces and a second outer raceway surface located on the other side in the axial direction out of the double row outer raceway surfaces. The plurality of first balls and the plurality of second balls have a same diameter, and a contact angle of the plurality of first balls is smaller than a contact angle of the plurality of second balls.

According to this configuration, the contact angle of the plurality of first balls is smaller than the contact angle of the plurality of second balls. Therefore, the difference between the contact angle of the first balls and the contact angle of the second balls is less likely to increase even when a lower side of a side surface of a wheel hits a curb, an excessive moment load is applied to the inner member, and the contact angle of the first balls temporarily increases. As a result, a relative decrease in allowable radial load on the plurality of first balls can be reduced, and concentration of a load on the first balls can be reduced, so that brinelling on the first inner raceway surface and the first outer raceway surface can be reduced.

(2) In the above wheel bearing device, a pitch diameter of the plurality of first balls is preferably larger than a pitch diameter of the plurality of second balls. In this case, an allowable load for a load that is applied to the plurality of first balls can be increased, so that brinelling on the first inner raceway surface and the first outer raceway surface can be effectively reduced. Reducing the contact angle of the plurality of first balls may reduce an allowable load for an axial load and may shorten the service life as a bearing from normal use. Therefore, the service life of the plurality of first balls, the first outer raceway surface, and the first inner raceway surface as a bearing may become shorter than the service life of the plurality of second balls, the second outer raceway surface, and the second inner raceway surface. In this regard, the pitch diameter of the plurality of first balls is made larger than the pitch diameter of the plurality of second balls to increase the allowable load for the load that is applied to the plurality of first balls. This can compensate for relative shortening of the service life of the plurality of first balls, the first outer raceway surface, and the first inner raceway surface that is caused by changing the contact angle. As a result, the overall service life of the wheel bearing device is less likely to be shortened.

(3) In the above wheel bearing device, an axial position of a point of intersection between a first line of action of a load that is applied to the plurality of first balls and a second line of action of a load that is applied to the plurality of second balls is preferably located on the one side in the axial direction with respect to an axial midpoint between an axial position of a bottom of the first outer raceway surface and an axial position of a bottom of the second outer raceway surface. The first line of action of the load that is applied to the plurality of first balls forms the contact angle of the plurality of first balls with a plane perpendicular to a central axis of the wheel bearing device. The second line of action of the load that is applied to the plurality of second balls forms the contact angle of the plurality of second balls with a plane perpendicular to the central axis of the wheel bearing device. Therefore, the contact angle of the plurality of first balls can be set to a smaller angle than the contact angle of the plurality of second balls by making the axial position of the point of intersection between the first line of action and the second line of action located on the one side in the axial direction with respect to the axial midpoint between the axial position of the bottom of the first outer raceway surface and the axial position of the bottom of the second outer raceway surface.

(4) Further, in this case, the outer member preferably includes, on an outer periphery of the outer member, a vehicle body mounting flange that is for the outer member to be mounted on a vehicle body, and an axial position of an axial middle of the vehicle body mounting flange is preferably a position located closer to the axial position of the bottom of the first outer raceway surface than to the axial position of the bottom of the second outer raceway surface.

In this case, the axial position of the vehicle body mounting flange and the axial position of the wheel mounting flange to which a load is applied are located closer to each other compared to the case where, for example, the vehicle body mounting flange is provided at the end on the other side in the axial direction of the outer member. This can reduce a moment load that is applied to the entire wheel bearing device via the wheel mounting flange when the lower side of the side surface of the wheel hits a curb, and can effectively reduce brinelling on the first inner raceway surface and the first outer raceway surface.

(5) The outer member may include, on an outer periphery of the outer member, a vehicle body mounting flange that is for the outer member to be mounted on a vehicle body, and an axial position of an axial middle of the vehicle body mounting flange may be located on the one side in the axial direction with respect to an axial midpoint between the axial position of the bottom of the first outer raceway surface and the axial position of the bottom of the second outer raceway surface. In this case as well, the axial position of the vehicle body mounting flange and the axial position of the wheel mounting flange to which a load is applied are located closer to each other compared to the case where the vehicle body mounting flange is provided at the end on the other side in the axial direction of the outer member. This can reduce a moment load that is applied to the entire wheel bearing device via the wheel mounting flange when the lower side of the side surface of the wheel hits a curb, and can effectively reduce brinelling on the first inner raceway surface and the first outer raceway surface.

(6) The axial position of the point of intersection is preferably located on the one side in the axial direction with respect to the axial position of the axial middle of the vehicle body mounting flange. In this case, the axial position of the point of intersection gets closer to the axial middle of the vehicle body mounting flange and the axial midpoint when the lower side of the side surface of the wheel hits a curb and the contact angle of the first balls temporarily increases. Therefore, a load transmitted to the outer member via the first and second balls can be borne by the outer member at a position near the vehicle body mounting flange and the bearing center. As a result, a load that occurs as the lower side of the side surface of the wheel hits a curb is less likely to be borne by only one side in the axial direction of the outer member, so that the load transmitted to the outer member can be appropriately borne.

Details of Embodiment

Hereinafter, a preferred embodiment will be described with reference to the drawings.
[Overall Configuration of Bearing Device]
FIG. 1 is a sectional view of a wheel bearing device 10. The wheel bearing device 10 (hereinafter sometimes simply referred to as bearing device 10) is a bearing device that is used in vehicles such as automobiles, and is also called a hub unit. The bearing device 10 rotatably supports a wheel with respect to a suspension system mounted on a vehicle body of an automobile.

The bearing device 10 includes an outer ring 11 (outer member), an inner shaft 12 (inner member), a plurality of balls 13, a cage 14, and seal members 15, 16. The outer ring 11 and the inner shaft 12 are disposed concentrically. In the present embodiment, the inner shaft 12 is rotatable with respect to the outer ring 11 about a central axis C1. That is, the outer ring 11 is a fixed ring, and the inner shaft 12 is a rotating ring (rotating shaft).

In the following description, a direction along the central axis C1 will be referred to as "axial direction." The axial direction also includes a direction parallel to the central axis C1. In the state where the bearing device 10 is mounted on the vehicle body of the automobile, the vehicle outer side will be referred to as one side in the axial direction, and the vehicle inner side will be referred to as the other side in the axial direction. A direction orthogonal to the axial direction will be referred to as "radial direction." A direction in which the inner shaft 12 rotates about the central axis C1 will be referred to as "circumferential direction." The bearing device 10 can rotatably support, with respect to the vehicle body, the inner shaft 12 to which the wheel and a brake disc, both not shown, are fixed so as to be rotatable with the inner shaft 12.

The outer ring 11 is made of carbon steel for machine structural use etc. The outer ring 11 has a cylindrical shape and has a vehicle body mounting flange 11b on its outer peripheral surface 11a. The vehicle body mounting flange 11b is a member for mounting the outer ring 11 on the vehicle body.

Figure 2:
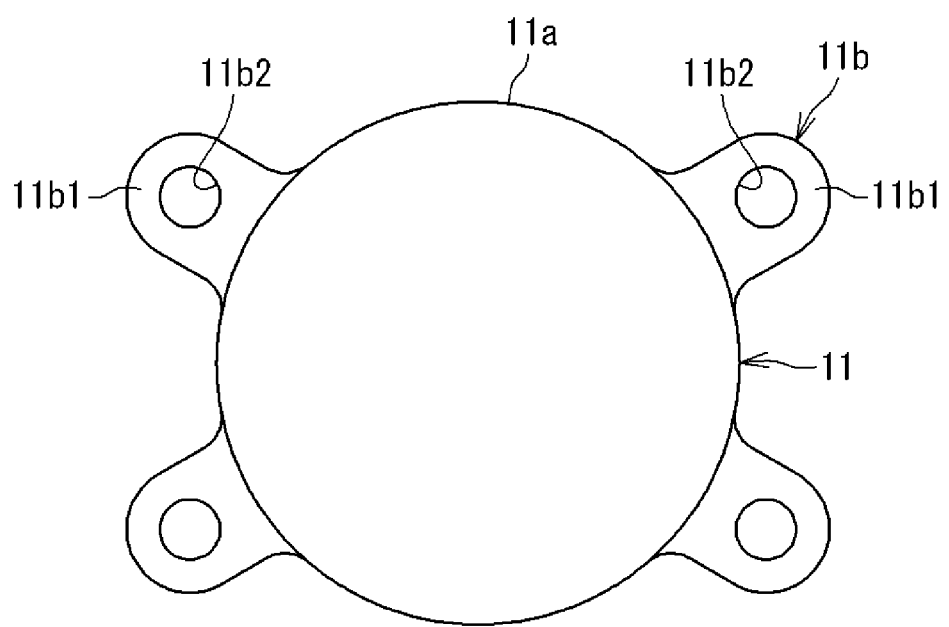
FIG. 2 is a diagram of a vehicle body mounting flange as viewed along a central axis from the vehicle inner side.

FIG. 2 is a diagram of the vehicle body mounting flange 11b as viewed along the central axis C1 from the vehicle inner side. As shown in FIG. 2, the vehicle body mounting flange 11b has a plurality of protruding portions 11b1 provided along the circumferential direction. The plurality of protruding portions 11b1 (four in the illustrated example) protrudes from the outer peripheral surface 11a. Each protruding portion 11b1 has a through hole 11b2 parallel to the central axis C1. Bolts for fixing the outer ring 11 to the suspension system on the vehicle body side are inserted through the through holes 11b2. In the present embodiment, the plurality of protruding portions 11b1 is provided symmetrically in an up-down direction. However, the plurality of protruding portions 11b1 may be provided at regular intervals in the circumferential direction. The number of protruding portions 11b1 may be larger or smaller than in the illustrated example.

As shown in FIG. 1, the inner peripheral surface of the outer ring 11 is provided with double row outer raceway surfaces 17. The double row outer raceway surfaces 17 include a first outer raceway surface 17a and a second outer raceway surface 17b. The first outer raceway surface 17a is provided on the one side in the axial direction with respect to the second outer raceway surface 17b. The outside diameter of the first outer raceway surface 17a is larger than the outside diameter of the second outer raceway surface 17b.

The inner shaft 12 is made of carbon steel for machine structural use etc. The inner shaft 12 includes a shaft member 18 and an inner ring 19. The shaft member 18 has a body portion 18a extending in the axial direction and a wheel mounting flange 18b protruding radially outward from the body portion 18a. The body portion 18a and the wheel mounting flange 18b are formed as a single piece. The wheel mounting flange 18b is provided on the one side in the axial direction of the body portion 18a. The wheel and brake disc (both not shown) are attached to the wheel mounting flange 18b.

The inner ring 19 is an annular member made of carbon steel for machine structural use etc. The inner ring 19 is fixed to an end portion on the other side in the axial direction of the shaft member 18. A small diameter portion 18c with a smaller outside diameter than the remaining part of the body portion 18a is provided on the other side in the axial direction of the shaft member 18. The inner ring 19 is press-fitted onto the small diameter portion 18c from the other side in the axial direction and fitted on the outer peripheral surface of the small diameter portion 18c. An end 18d on the other side in the axial direction of the shaft member 18 is plastically deformed radially outward for clinching. The inner ring 19 is thus secured by the shaft member 18.

The outer peripheral surface of the inner shaft 12 is provided with double row inner raceway surfaces 20. The double row inner raceway surfaces 20 include a first inner raceway surface 20a and a second inner raceway surface 20b. The first inner raceway surface 20a is provided on the outer peripheral surface of the body portion 18a of the shaft member 18. The first inner raceway surface 20a faces the first outer raceway surface 17a. The second inner raceway surface 20b is provided on the outer peripheral surface of the inner ring 19. The second inner raceway surface 20b faces the second outer raceway surface 17b. The first inner raceway surface 20a is thus provided on the one side in the axial direction with respect to the second inner raceway surface 20b.

Each of the plurality of balls 13 is a ball made of bearing steel etc. The plurality of balls 13 includes a plurality of first balls 13a and a plurality of second balls 13b. The plurality of first balls 13a is interposed between the first outer raceway surface 17a and the first inner raceway surface 20a. The plurality of second balls 13b is interposed between the second outer raceway surface 17b and the second inner raceway surface 20b. The diameter of the plurality of first balls 13a and the diameter of the plurality of second balls 13b are the same.

The plurality of balls 13 is in point contact with the outer raceway surfaces 17a, 17b and the inner raceway surfaces 20a, 20b at a predetermined contact angle. That is, the bearing device 10 includes a double row angular contact ball bearing, and each of the outer ring 11 and the inner shaft 12 forms a bearing ring.

The cage 14 is an annular member made of resin. The cage 14 holds the plurality of balls 13 in each row at predetermined intervals in the circumferential direction. The seal member 15 is attached between an end on the one side in the axial direction of the outer ring 11 and the body portion 18a. The seal member 16 is attached between an end on the other side in the axial direction of the outer ring 11 and the inner ring 19. The seal members 15, 16 serve to prevent foreign matter such as muddy water from entering an annular space formed between the outer ring 11 and the inner shaft 12 and to seal the annular space so that a lubricant in the annular space does not leak.

Figure 3:
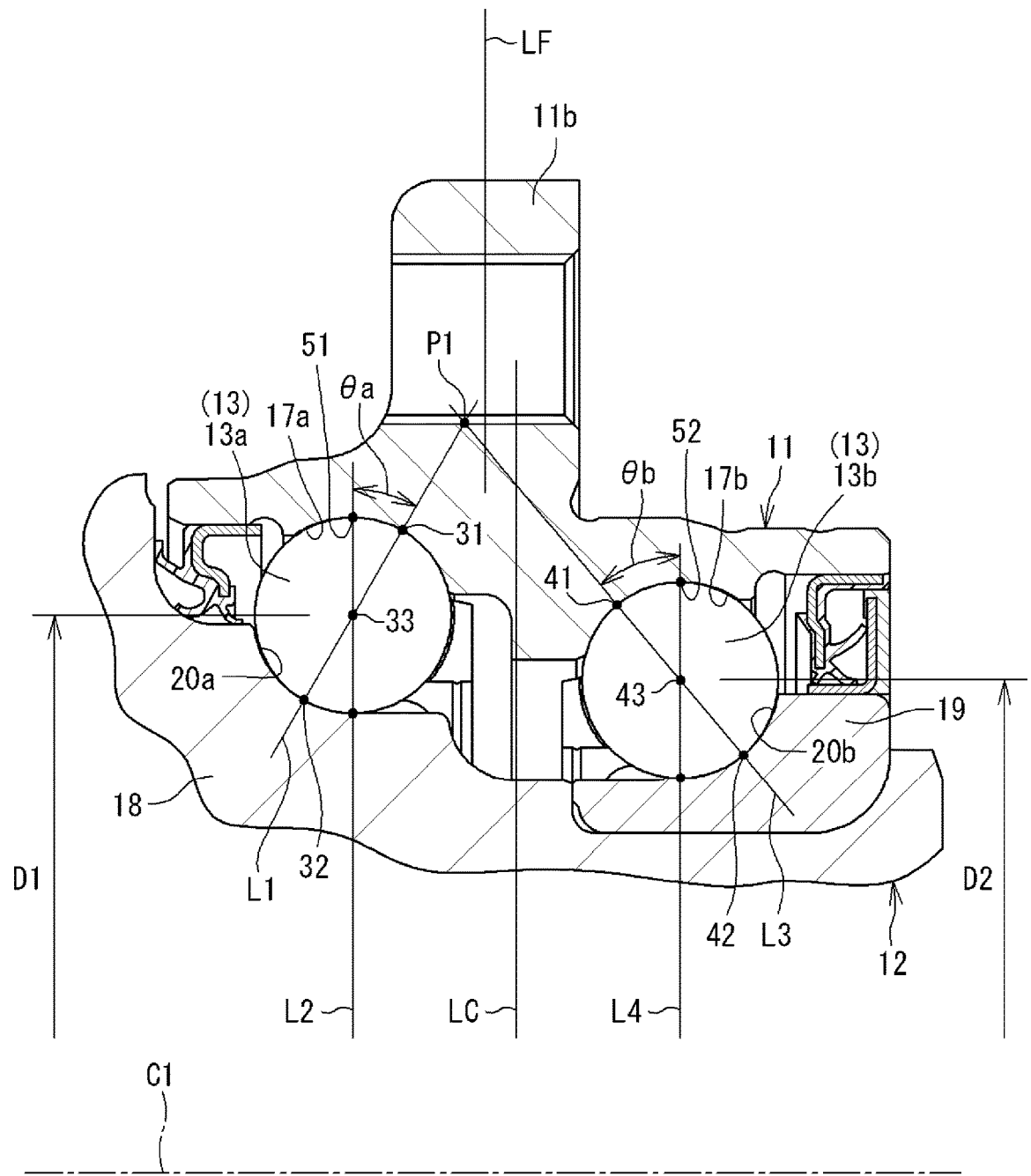
FIG. 3 is a sectional view of a main part of the bearing device.

FIG. 3 is a sectional view of a main part of the bearing device 10. As shown in FIG. 3, a pitch diameter D1 of the plurality of first balls 13a is larger than a pitch diameter D2 of the plurality of second balls 13b.

In the present embodiment, a contact angle θa of the plurality of first balls 13a is 30 degrees, and a contact angle θb of the plurality of second balls 13b is 40 degrees. The contact angle θa of the plurality of first balls 13a is thus smaller than the contact angle θb of the plurality of second balls 13b. The contact angle θa of the plurality of first balls 13a is set within the range of 25 to 35 degrees. The contact angle θb of the plurality of second balls 13b is set within the range of 35 to 45 degrees. The contact angle of the ball 13 is the angle formed by a plane perpendicular to the central axis C1 (radial plane) and a line of action of the resultant of forces that are transmitted to the ball 13 by the outer ring 11 and the inner shaft 12. A first line of action L1 of a load that is applied to the first ball 13a is a straight line passing through a contact portion 31 of the first ball 13a with the first outer raceway surface 17a, a contact portion 32 of the first ball 13a with the first inner raceway surface 20a, and the center 33 of the first ball 13a. The contact angle θa of the first ball 13a is the angle formed by the first line of action L1 and a straight line L2 passing through the center 33 of the first ball 13a and orthogonal to the central axis C1. A second line of action L3 of a load that is applied to the second ball 13b is a straight line passing through a contact portion 41 of the second ball 13b with the second outer raceway surface 17b, a contact portion 42 of the second ball 13b with the second inner raceway surface 20b, and the center 43 of the second ball 13b. The contact angle θb of the second ball 13b is the angle formed by the second line of action L3 and a straight line L4 passing through the center 43 of the second ball 13b and orthogonal to the central axis C1.

The axial position of the point of intersection P1 between the first line of action L1 and the second line of action L3 is located on the one side in the axial direction with respect to the axial midpoint between the axial position of the first outer raceway surface 17a the axial position of the second outer raceway surface 17b. More specifically, the straight line L2 passes through a bottom 51 of the first outer raceway surface 17a. The straight line L4 passes through a bottom 52 of the second outer raceway surface 17b. In FIG. 3, an axial centerline LC is orthogonal to the central axis C1 and is located at the axial midpoint between the straight lines L2, L4. The point of intersection P1 is located on the one side in the axial direction with respect to the axial centerline LC. The axial position of the point of intersection P1 is therefore located on the one side in the axial direction with respect to the axial midpoint between the axial position of the bottom 51 of the first outer raceway surface 17a and the axial position of the bottom 52 of the second outer raceway surface 17b.

The axial position of the vehicle body mounting flange 11b of the present embodiment is located between the straight line L2 and the straight line L4. More specifically, a straight line LF indicating the axial middle of the vehicle body mounting flange 11b is a straight line orthogonal to the central axis C1 and passing through the axial middle of the vehicle body mounting flange 11b. The straight line LF is located on the one side in the axial direction with respect to the axial centerline LC. The axial position of the axial middle of the vehicle body mounting flange 11b is therefore located on the one side in the axial direction with respect to the axial midpoint between the axial position of the bottom 51 of the first outer raceway surface 17a and the axial position of the bottom 52 of the second outer raceway surface 17b. In other words, the axial position of the axial middle of the vehicle body mounting flange 11b is a position located closer to the axial position of the bottom 51 of the first outer raceway surface 17a than to the axial position of the bottom 52 of the second outer raceway surface 17b.

The axial position of the point of intersection P1 is located on the one side in the axial direction with respect to the straight line LF. The axial position of the point of intersection P1 is therefore located on the one side in the axial direction with respect to the axial position of the axial middle of the vehicle body mounting flange 11b.

[When Lower Side of Side Surface of Wheel Hits Curb]

Figure 4:
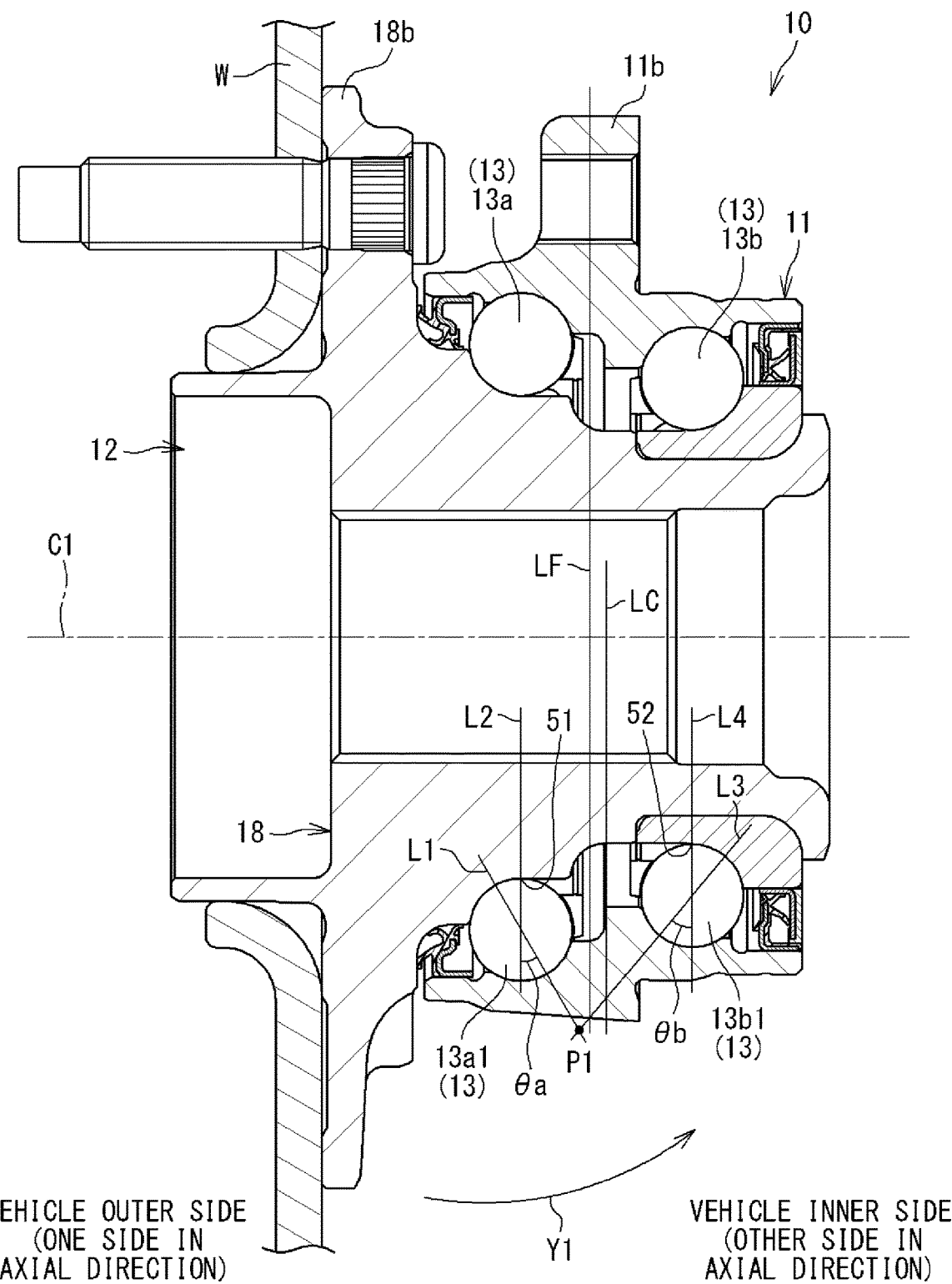
FIG. 4 is a sectional view of the wheel bearing device, illustrating the case where the lower side of a side surface of a wheel hits a curb.

FIG. 4 is a sectional view of the wheel bearing device 10, illustrating the case where the lower side of a side surface of the wheel hits a curb. For example, it is herein assumed that the lower side of a side surface of a wheel W hits a curb. At this time, an excessive moment load is applied to the inner shaft 12 in a direction shown by arrow Y1 via the wheel mounting flange 18b. When such an excessive moment load is applied to the inner shaft 12, the first balls 13a1 located below the central axis C1 out of the plurality of first balls 13a are subjected to a large load.

Moreover, when such an excessive moment load is applied, the contact angle θa of these first balls 13a1 temporarily increases. On the other hand, the contact angle θb of the second balls 13b1 located below the central axis C1 out of the plurality of second balls 13b temporarily decreases.

When such a moment load is applied to the inner shaft 12 and the contact angle θa of the first balls 13a1 increases, an allowable radial load on the first balls 13a1 relatively decreases, and the load is concentrated on the first balls 13a1, which may facilitate brinelling on the first outer raceway surface 17a.

In this regard, in the present embodiment, the contact angle θa of the plurality of first balls 13a is smaller than the contact angle θb of the plurality of second balls 13b. Therefore, the difference between the contact angle θa of the first balls 13a and the contact angle θb of the second balls 13b is less likely to increase even when the lower side of the side surface of the wheel W hits a curb and the contact angle θa of the first balls 13a1 temporarily increases. As a result, the relative decrease in allowable radial load on the plurality of first balls 13a can be reduced, and concentration of the load on the first balls 13a can be reduced, so that brinelling on the first inner raceway surface 20a and the first outer raceway surface 17a can be reduced.

In the present embodiment, the contact angle θa of the plurality of first balls 13a is made smaller than the contact angle θb of the plurality of second balls 13b. This reduces slipping between the plurality of first balls 13a and the first outer raceway surface 17a and the first inner raceway surface 20a, so that an increase in overall temperature of the wheel bearing device 10 can be reduced and the running torque can be reduced.

In the present embodiment, the pitch diameter D1 of the plurality of first balls 13a is larger than the pitch diameter D2 of the plurality of second balls 13b. Therefore, the allowable load for the load that is applied to the plurality of first balls 13a can be made larger than the allowable load for the load that is applied to the plurality of second balls 13b. This can effectively reduce brinelling on the first inner raceway surface 20a and the first outer raceway surface 17a. Reducing the contact angle θa of the plurality of first balls 13a may reduce the allowable load for an axial load and may shorten the service life as a bearing from normal use. Therefore, the service life of the plurality of first balls 13a and the raceway surfaces 17a, 20a as a bearing may become shorter than the service life of the plurality of second balls 13b and the raceway surfaces 17b, 20b as a bearing. In this regard, in the present embodiment, the pitch diameter D1 of the plurality of first balls 13a is made larger than the pitch diameter D2 of the plurality of second balls 13b to increase the allowable load for the load that is applied to the plurality of first balls 13a. This can compensate for relative shortening of the service life of the plurality of first balls 13a and the raceway surfaces 17a, 20a that is caused by changing the contact angle θa. As a result, the overall service life of the wheel bearing device 10 is less likely to be shortened.

In the present embodiment, the axial position of the axial middle of the vehicle body mounting flange 11b (straight line LF) is located on the one side in the axial direction with respect to the axial midpoint between the axial position of the bottom 51 of the first outer raceway surface 17a and the axial position of the bottom 52 of the second outer raceway surface 17b. In other words, the axial position of the axial middle of the vehicle body mounting flange 11b (straight line LF) is located closer to the axial position of the bottom 51 of the first outer raceway surface 17a than to the axial position of the bottom 52 of the second outer raceway surface 17b.

Therefore, the axial position of the vehicle body mounting flange 11b and the axial position of the wheel mounting flange 18b to which a load is applied are located closer to each other compared to the case where, for example, the vehicle body mounting flange 11b is provided at the end on the vehicle inner side of the outer ring 11. This can reduce the moment load that is applied to the entire bearing device 10 via the wheel mounting flange 18b when the lower side of the side surface of the wheel W hits a curb. As a result, brinelling on the first inner raceway surface 20a and the first outer raceway surface 17a can be effectively reduced.

Moreover, since the vehicle body mounting flange 11b is provided at a position close to the axial position of the bottom 51 of the first outer raceway surface 17a, the point of intersection P1 and the vehicle body mounting flange 11b can be located close to each other in the axial direction. Accordingly, the load transmitted from the inner shaft 12 to the outer ring 11 via the first and second balls 13a, 13b in cases other than when the lower side of the side surface of the wheel W hits a curb can be borne by the outer ring 11 at a position near the vehicle body mounting flange 11b. The load transmitted from the inner shaft 12 to the outer ring 11 via the first and second balls 13a, 13b in cases other than when the lower side of the side surface of the wheel W hits a curb can thus be appropriately borne.

In the present embodiment, the axial position of the point of intersection P1 is located on the one side in the axial direction with respect to the axial position of the axial middle of the vehicle body mounting flange 11b (straight line LF). Therefore, when the lower side of the side surface of the wheel W hits a curb and the contact angle θa of the first balls 13a1 temporarily increases, the axial position of the point of intersection P1 gets closer to the straight line LF and the axial centerline LC. Therefore, the load transmitted to the outer ring 11 via both balls 13a, 13b can be borne by the outer ring 11 at a position near the vehicle body mounting flange 11b and the axial centerline LC. As a result, the load that occurs as the lower side of the side surface of the wheel W hits a curb is less likely to be borne by only one side in the axial direction of the outer ring 11.

[Others]

The embodiment disclosed herein is illustrative in all respects and not restrictive. For example, the present embodiment illustrates an example in which the axial position of the axial middle of the vehicle body mounting flange 11b is located on the one side in the axial direction with respect to the axial midpoint between the axial position of the bottom 51 of the first outer raceway surface 17a and the axial position of the bottom 52 of the second outer raceway surface 17b. However, the axial position of the axial middle of the vehicle body mounting flange 11b may be located on the other side in the axial direction with respect to the axial midpoint between the axial position of the bottom 51 of the first outer raceway surface 17a and the axial position of the bottom 52 of the second outer raceway surface 17b.

The present embodiment illustrates an example in which the axial position of the point of intersection P1 is located on the one side in the axial direction with respect to the axial position of the axial middle of the vehicle body mounting flange 11b. However, the axial position of the point of intersection P1 may be located on the other side in the axial direction with respect to the axial position of the axial middle of the vehicle body mounting flange 11b. In other words, the axial position of the axial middle of the vehicle body mounting flange 11b may be located on the one side in the axial direction with respect to the axial position of the point of intersection P1.

The scope of the present invention is not limited to the above embodiments, and includes all modifications that fall within the scope equivalent to the configurations described in the claims.

DESCRIPTION OF THE REFERENCE NUMERALS

10 . . . wheel bearing device, 11 . . . outer ring, 11a . . . outer peripheral surface, 11b . . . vehicle body mounting flange, 11b1 . . . protruding portion, 11b2 . . . through hole, 12 . . . inner shaft, 13 . . . ball, 13a, 13a1 . . . first ball, 13b, 13b1 . . . second ball, 14 . . . cage, 15 . . . seal member, 16 . . . seal member, 17 . . . outer raceway surface, 17a . . . first outer raceway surface, 17b . . . second outer raceway surface, 18 . . . shaft member, 18a . . . body portion, 18b . . . wheel mounting flange, 18c . . . small diameter portion, 18d . . . end, 19 . . . inner ring, 20 . . . inner raceway surface, 20a . . . first inner raceway surface, 20b . . . second inner raceway surface, 31 . . . contact portion, 32 . . . contact portion, 33 . . . center, 41 . . . contact portion, 42 . . . contact portion, 43 . . . center, 51 . . . bottom, 52 . . . bottom, C1 . . . central axis, D1 . . . pitch diameter, D2 . . . pitch diameter, L1 . . . first line of action, L2 . . . straight line, L3 . . . second line of action, L4 . . . straight line, LC . . . axial centerline, LF . . . straight line, P1 . . . point of intersection, W . . . wheel, Y1 . . . arrow, Y2 . . . arrow, θa . . . contact angle, θb . . . contact angle

The invention claimed is:

1. A wheel bearing device comprising:
an inner member including double row inner raceway surfaces and including a wheel mounting flange in a first axial direction of the double row inner raceway surfaces;
an outer member including double row outer raceway surfaces facing the double row inner raceway surfaces;
a plurality of first balls interposed between a first inner raceway surface located in the first axial direction out of the double row inner raceway surfaces and a first outer raceway surface located in the first axial direction out of the double row outer raceway surfaces; and
a plurality of second balls interposed between a second inner raceway surface located in a second axial direction opposite the first axial direction out of the double row inner raceway surfaces and a second outer raceway surface located in the second axial direction out of the double row outer raceway surfaces, wherein
the plurality of first balls and the plurality of second balls have a same diameter,
a contact angle of the plurality of first balls is smaller than a contact angle of the plurality of second balls,
an axial position of a point of intersection between a first line of action of a load that is applied to the plurality of first balls and a second line of action of a load that is applied to the plurality of second balls is located in the first axial direction with respect to an axial midpoint between an axial position of a bottom of the first outer raceway surface and an axial position of a bottom of the second outer raceway surface,
the outer member includes, on an outer periphery of the outer member, a vehicle body mounting flange that is for the outer member to be mounted on a vehicle body, an axial position of an axial middle of the vehicle body mounting flange is located in the first axial direction with respect to the axial midpoint between the axial position of the bottom of the first outer raceway surface and the axial position of the bottom of the second outer raceway surface, and the axial position of the point of intersection is located in the first axial direction with respect to the axial position of the axial middle of the vehicle body mounting flange.

2. The wheel bearing device according to claim 1, wherein a pitch diameter of the plurality of first balls is larger than a pitch diameter of the plurality of second balls.

3. The wheel bearing device according to claim 1, wherein:

the axial position of the axial middle of the vehicle body mounting flange is located closer to the axial position of the bottom of the first outer raceway surface than to the axial position of the bottom of the second outer raceway surface.

* * * * *